Sept. 6, 1966 C. D. BAXTER ETAL 3,271,150
PHOTOGRAPHIC PRINTING PLATE
Filed April 1, 1963

Carlton D. Baxter
Henry C. Staehle
INVENTORS
BY R. Frank Smith
Henry E. Byers
ATTORNEYS United States Patent Office 3,271,150

Patented Sept. 6, 1966

3,271,150

PHOTOGRAPHIC PRINTING PLATE

Carlton D. Baxter and Henry C. Staehle, Rochester, N.Y., assignors to Eastman Kodak Company, Rochester, N.Y., a corporation of New Jersey Filed Apr. 1, 1963, Ser. No. 269,345
20 Claims. (Cl. 96—36.3)

This invention concerns a relief printing plate, more particularly a relief plate obtained by deep etching a cellulose ester support by means of an integral resist image prepared by photographic means.

Photographic relief printing plates are well known since it has been relatively easy to obtain a photographic image in hardened colloid which could be obtained in a relief form by washing away the unhardened areas of the photographic emulsion.

To prepare conventional relief printing plates for direct or indirect printing having considerable relief, metal plates on which a photographic image has been formed have been etched. However, this method requires precautionary measures to reduce undercutting of the resist image areas while the plate is being etched to sufficient depth in clear areas. "Powdering" or "staging" techniques, e.g., involving application of dragon's blood, and the use of emulsified solvents, are common with metal plates. In spite of these techniques, these metal plates often lack detail due to the undercutting or removal of dot areas. Moreover, the process of preparing metal plates has been relatively expensive. Therefore, it has been desirable to make printing plates for direct printing having better detail and less cost than the conventional metal plates.

Attempts have been made in the past to prepare plastic relief printing plates by photograph means involving formation of a colloid resist image on a plastic layer, followed by solvent treatment of the unprotected areas to form a relief useful in typographic or in intaglio printing. However, none of the prior art systems has been capable of providing relief printing plates in which both line and halftone subject matter can be adequately reproduced with identical processing to yield good print quality, nor have any automatically provided a deep etching without undercutting in areas of line exposure and at the same time shallow etching in halftone areas.

In many cases the solvent composition would etch unevenly or would fail to penetrate adequately through the subbing which was used to effect adhesion of the photographic emulsion to the film base. In some instances the solvent action resulted in destroying the adhesion of the photographic image or else in etching into the film base under the image area so that prints made therefrom lacked definition. Moreover, commonly used film base is relatively thin so that an active solvent might result in a uniform softening or overall etching of the film base so that the rigidity or dimensional stabilization of the film base was destroyed.

We have found a unique combination of elements which can be used to provide a plastic printing plate suitable for making photographic engravings for letter press printing directly from high contrast photographic emulsions.

One object of this invention is to provide a plastic printing plate for use in typographic printing which has printing elements adequate for reproduction of both fine halftone detail and broad line images including type matter. Another object is to provide such a material having a subbing layer which will provide good adhesion of the light-sensitive layer and the colloid relief image, but will not impede etching in the unprotected areas. A further object is to provide a relief printing plate material having a light-sensitive layer which can be easily processed to form a resist image, which can be used to control subsequent etching of the support. An additional object is to provide a printing plate having an etchable plastic relief forming a layer of extraordinary thickness to permit formation of a considerable relief depth. A further object is to provide a relief printing plate of a plastic material which is laminated to a dimensionally stable support. Another object is to provide a method of etching that insures good press life and faithful reproduction of both line and halftone detail.

Other objects will appear from the following description of this invention.

We have accomplished these objects by the use of a photosensitive printing plate material comprising a rigid or semirigid, dimensionally stable base to which is bonded a thick uniform film support of cellulose ester bearing a cellulose ester-gelatin subbing layer, overcoated with a light-sensitive emulsion.

The emulsion must be processed to a hardened resist image. If unhardened emulsions are used, the tanning agents may be incorporated in the emulsion or included in the processing solutions. If hardened emulsions are used, the resist image is formed by an etch bleach process described in Example VIII.

In a typical embodiment of this invention the use of a silver halide emulsion layer containing a substantially water-insoluble tanning developing agent is advantageous. Such an emulsion layer is coated on a cellulose ester layer which contains no hardening agent for the emulsion and is adapted to give good adhesion to the emulsion, by means of an extremely thin subbing layer comprising a mixture of cellulose nitrate and gelatin. The cellulose ester layer is a solvent-etchable material, preferably cellulose acetatebutyrate, and is relatively thick by comparison to normal film supports, so that it can be etched to a deep relief.

A cellulose ester film support is employed having a thickness of 0.010 to 0.020-inch and preferably of a thickness of 0.012 to 0.018-inch. Although the film support is preferably of cellulose acetatebutyrate, it may be of some other cellulose ester, for example, a cellulose ester such as cellulose acetate, cellulose acetate propionate, etc. The cellulose ester layer is laminated to a rigid or semirigid, humidity-stable base, such as a metal film or plate, so that dimensional change or distortion of the image during preparation and printing is minimized. The cellulose ester may be pigmented, for example, with titanium dioxide, etc., to provide a reflecting background for the image.

In our preferred embodiment a thin sheet of steel is used as the base. This steel is coated with an adhesive film, for example, about .002-inch of polyvinyl acetate. However, any suitable adhesive may be used and thickness of the adhesive is not critical provided it secures the film support to the base. A lacquer coating on the rigid support may be colored to provide an antihalation layer. In our preferred embodiment the antihalation feature is obtained from an orange-red lacquer which is coated on the steel.

The photosensitive material of our invention is processed to a relief printing plate capable of reproducing faithfully both line work and fine dot detail. For instance, the emulsion is exposed through a high contrast graphic arts type negative or to a screened photographic print. In the method of developing an unhardened emulsion with a silver halide tanning developer which hardens the image area, the non-image areas are removed by washing off the untanned gelatin. In the event a tanning developer containing emulsion is used, the emulsion is processed by imbibing an alkaline activator solution into the emulsion after which the non-image areas are washed away. The plate is then dried.

After photographic processing has been completed and a resist image in hardened gelatin has been formed, the exposed areas of the cellulose ester layer are subjected to repeated cycles of etching with semisolvent and removal of the semisolvent. The plate is attached to a convenient working surface and the semisolvent (etch solution comprising a mixture of a solvent and nonsolvent which swells and dissolves the ester suppor) is applied wih a pile-covered fabric swab, using a vigorous, irregular pattern of rubbing. The rubbing action is continued for not more than 2 minutes and the dissolved material is rinsed away immediately using fresh semisolvent or nonsolvent, and the plate dried to remove residual solvent. The cycle is then repeated.

In this manner, in a sequence of up to 40 cycles, the cellulose ester support is etched to sufficient depth for relief printing. Each cycle comprises at least three steps: (1) application of semisolvent, (2) scrubbing to facilitate solution and removal of the exposed cellulose ester material and (3) removal of residual semisolvent or nonsolvent (drying).

The length of time the etching can be carried out during one stage without loss of detail is primarily a function of the fineness of detail in the image. In the case of typography and relatively coarse line work, or even large halftone dots or tints, comparatively long stages may be employed so that depths of 0.002–0.003-inch in a 1-minute stage will result in no loss of detail. In the case of fine halftones, however, the etching stage is preferably considerably shorter so that depth for a plate containing 5 percent highlight dots in a 133-line screen would be 0.001-inch or less per 20- to 30-second stage.

At the conclusion of each etching stage in the cycle, it is preferred that all surface solvent be squeegeed off and that the plate be dried with hot air and/or infrared radiation, then subsequently cooled to room temperature before the next etching stage.

The etching operation in our invention is extremely critical. One way in which the etching may be conveniently carried out is to attach the plate to the surface of a cylindrical etching drum. The etching solution is applied preferably by a sponge or pad rotating in an orbital manner. As the plate revolves around the drum, it is subjected to succeeding stages of processing.

At the next stage, the excess etching solvent is removed from the surface of the plate followed by the drying step. This operation is then repeated with the etching, squeegeeing and drying steps, until satisfactory depth of etch is obtained.

The humidity-resistant rigid or semirigid base used to minimize image distortion and prevent dimensional changes can advantageously be a metal sheet or plate, e.g. iron, steel, copper, zinc, magnesium, aluminum, or the like, or it can be a plastic material such as a melamine formaldehyde, or phenol formaldehyde resin.

The subbing which holds the resist emulsion to the etchable cellulose ester layer performs a critical dual function in our invention. It must be of sufficient physical strength and hardness and sufficiently adherent to the adjacent surfaces to bond the cellulose ester layer firmly to the emulsion, and to the resist image formed in the initial processing step, yet it must be readily etched through by the etching solvent in the "nonresist" areas.

A sub of gelatin-cellulose nitrate mixture within relatively narrow limits can be used. The subbing layer, which is much thinner than normally used in photographic applications preferably contains between about 0.005 and 0.020 gram of solids per square foot, equivalent to 34 to 80 weight percent solids of gelatin and 66 to 20 weight percent solids of cellulose nitrate. The solvent used for applying the subbing layer should comprise a miscible mixture of solvents for both components, preferably a mixture of acetone, methanol and water.

A typical emulsion containing a tanning developing agent is described in column 3, lines 3 et seq., of U.S. Patent 2,596,756, issued May 13, 1952.

In the embodiment wherein the emulsions are substantially unhardened emulsions, they may contain up to 0.7 gram of dry formaldehyde per pound of dry freshly coated gelatin to reduce abrasion during handling, packaging, and storage, or 0.1 ounce of the formaldehyde solution (a 40% formaldehyde solution diluted 1 to 3 with water) per pound of gelatin for a sample aged 3 to 6 months.

The etching solvents are preferably miscible mixtures of at least one solvent for the cellulose ester support, and at least one nonsolvent. The solvents are chosen on the basis of their affect on the cellulose ester and their lack of attack on the gel resist image. Solvents may be, for example, isopropyl acetate, ethyl acetate, ethyl acetoacetate, 2-pentatone, actetone methylethyl ketone, glacial acetic acid, dichloromethane, "Cellosolve" (ethyleneglyco monomethylether), "Carbitol" (diethyleneglycol ethylether), etc. Nonsolvents may be, for example, methanol, propanol, isopropanol, butanol, diacetone alcohol, cyclohexane, xylene, toluene, cyclohexane, Stoddard solvent, etc. A particularly useful etching mixture comprises dimethyl sulfoxide and isopropyl alcohol. Still another mixture may be ethyl lactate and lactic acid.

It will be appreciated that the ratio of solvent to nonsolvent will depend upon the particular compounds used and their effect on the cellulose ester. Useful ranges of 1:10 to 10:1 can be used.

In the attached diagram are shown diagrammatic representations of a typical printing plate prepared according to our invention.

FIG. 1 shows the plate prior to formation of the relief image comprising the emulsion layer 11 coated over a thin subbing layer 12 over an extra thick cellulose ester layer 13. This cellulose ester layer is adhered by means of an adhesive layer 14 to a rigid or semirigid base 15.

Figure 1:
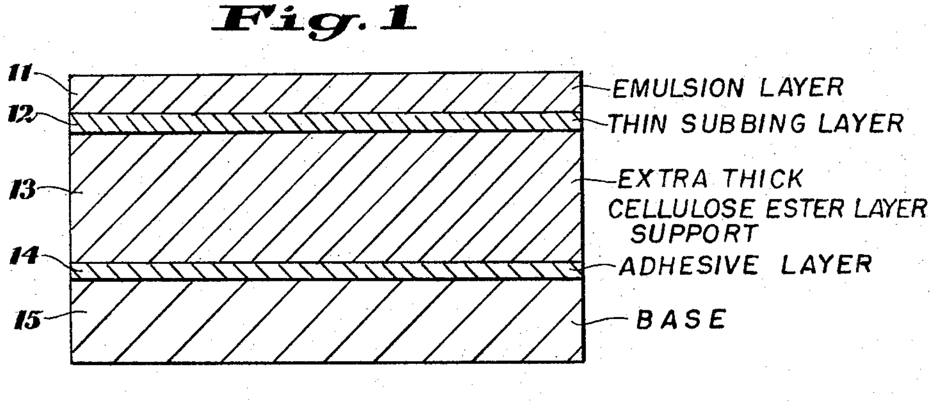
Figure 2:
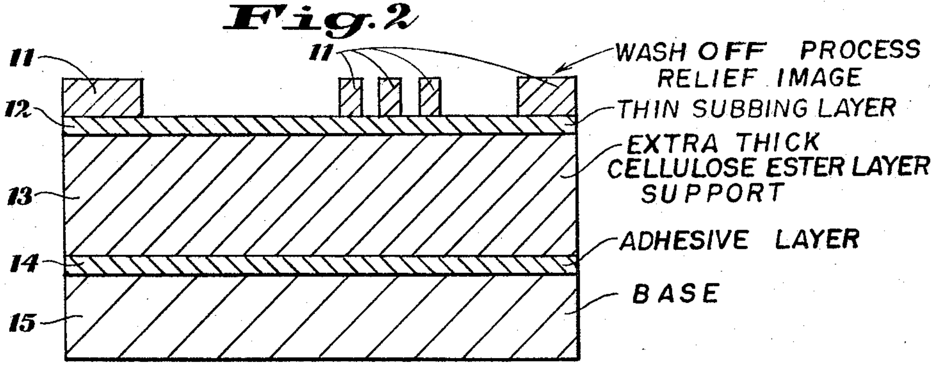
FIG. 2 shows the same printing plate material as illustrated in FIG. 1 after processing the exposed silver halide emulsion with a tanning developing agent and washing off the untanned areas of the emulsion layer.
Figure 3:
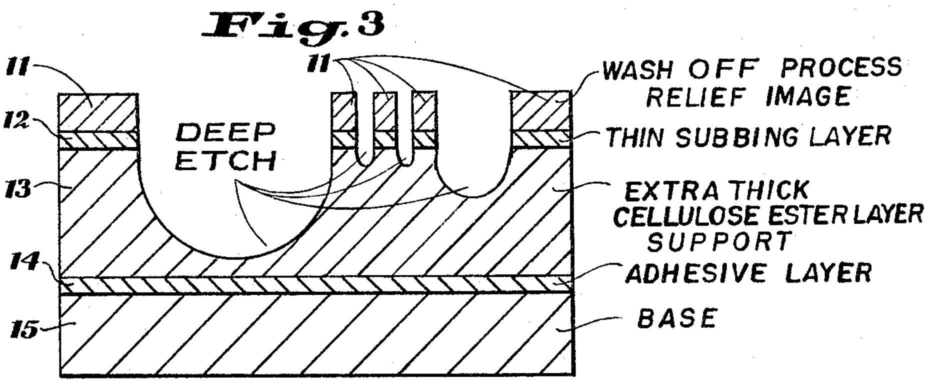
FIG. 3 shows the same printing plate as described in FIG. 2 after the etching step, ready for use on the printing press.

The following examples are intended to illustrate our invention but not to limit it in any way.

*Example I*

An emulsion of the type described in Example I of U.S. 2,596,756, issued May 13, 1952, containing an incorporated tanning developing agent was coated onto a sheet of 0.013 inch clear, cellulose acetatebutyrate bearing a very thin subbing layer. The sub was coated from a solution containing 25 percent cellulose nitrate and 75 percent gelatin at 0.012 gram per square foot using an acetone-methanol-water solvent. The back side of the acetatebutyrate carried a cellulose nitrate sub. A sheet of 0.010-inch steel plate having a polyvinyl acetate resin (Elvacet-Du Pont 60–05) coated from methanol about 0.005-inch thick was then laminated to the film product. To effect the lamination, a sheet of 8-inch x 10-inch film product was passed between heated rollers about 175° F. in contact with a slightly smaller piece of steel. This operation was carried out under a red safelight Series 1A. The element as prepared above was used in the following way to prepare a relief printing plate.

A high contrast negative having both 65-line halftone and line detail was used in close contact with the emulsion and an exposure of 30 seconds was made at 2 feet from a 100-watt lamp.

The exposed plate was transferred to an alkaline activator bath comprising 10 percent aqueous solution of sodium carbonate. After 1 minute, it was placed in a 5 percent acetic acid stop bath for 15 seconds to halt development. A warm water spray at 100° F. was used to remove the unhardened areas.

The plate was then dried in a drying cabinet for 10 minutes. The dried plate was attached firmly to a flat surface and the etching process was begun. A nylon velvet plush swab about 8 x 10 inches was used with the following solvent: 1 part ethyl acetate, 3 parts ethyl alcohol. A random pattern scrubbing action was used with moderate pressure. After about 30 seconds, a liberal amount of alcohol was applied to the surface to neutralize the solvent action, and to aid in the removal of the etched-out material which was effected with a rubber squeegee blade. The plate was then transferred to a drying cabinet at 150° F. for at least 5 minutes to remove substantially all of the solvent. The depth of the etching at the end of the first bite was only little more than 0.0005-inch.

A second treatment of solvent and swabbing action was given following the procedure used previously. The cycles of etching, neutralizing, and drying were contined for 8 times to produce a printing plate. Fine image dot detail was retained and the broad non-printing areas were etched to 0.005-inch.

The plate was printed on a proof press and gave excellent prints. It was then locked into a chase and printed on a Miehle Vertical press. Seven thousand copies were printed on coated stock paper with no loss in quality.

*Example II*

A relief printing plate suitable for extended run on a printing press was prepared in the following way.

A thin gelatin layer comprising a silver chloride emulsion of the type described in Example 3 of U.S. 2,596,756 was coated on a sheet of cellulose acetatebutyrate which was 0.010-inch thick. The dried down thickness of the light-sensitive emulsion was about 0.0002-inch. The acetatebutyrate sheet had been subbed on the emulsion side with a very thin sub consisting of 30 percent cellulose nitrate and 70 percent gelatin in a solvent comprising acetone, methanol and water so that the solids content was about 0.01 gram per square foot. The opposite side of the acetatebutyrate sheet was coated with a thin dope of cellulose acetate in an acetone methanol solution containing 10 percent titanium dioxide by weight of the solids.

A .010-inch steel sheet having an orange vinyl lacquer coating on both sides was attached to the white pigmented side of the photosensitive element using a heat sensitive resin of partially hydrolyzed polyvinyl acetate. The vinyl resin of Example I was applied to the steel plate; the acetatebutyrate sheet containing the light-sensitive emulsion was pressed thereon at an edge and the sandwich passed between heated rollers at about 175° F. to effect a good bond.

An etch resist image was next made in the emulsion layer. Exposure to a high contrast line image for 20 seconds to a 100-watt lamp at a distance of 2 feet was followed by development in a tanning developer. The developer consisted of equal parts of two solutions:

(a) 5 gms. catechol and 1 gm. sodium bisulfite (in 500 ml. of water)
(b) 25 gms. sodium hydroxide and 2 gms. potassium bromide (in 500 ml. of water)

Development took place for 2 minutes at 75° F. It was followed by a short rinse in a 1 percent acetic acid stop bath. A warm water spray at 110° F. was used to wash out unhardened emulsion leaving a hardened gel image in the areas which had been exposed. The plate was dried. The black image areas were boldly revealed against the white background of the pigmented layer.

Etching a relief image was carried out on a drum arrangement which mechanized the alternate application of solvent, rubbing action, removal of loose swollen material and drying. The plate was attached to a cylinder for the etch operation. The etch cycle began with scrubbing action due to an oscillating of the scrubber pad of a pile fabric (nylon) mounted on an axis parallel to the cylinder. The etchant, 3 parts ethyl acetate, 1 part ethyl alcohol, was applied through slots in the center of the scrubber pad. As the cylinder rotated, an alcohol rinse to stop the solvent action was applied immediately beyond the swab area. Halfway through the cycle the used etchant and dissolved plate material were removed by a rubber squeegee blade. This was followed by impingement of heated air supplied by several heat guns to remove essentially all of the solvent and dry the plate before the beginning of the next cycle.

It is essential that the etching be carried on in cycles with complete drying of the plate between successive stages of etching. The drying in this case was effected by a hot air stream although infrared lamps or radiant heaters may be used. Unheated air was blown over the dried plate to cool it substantially to room temperature before beginning the next cycle. One complete cycle took approximately one-half minute with about 15 seconds for etching and scrubbing, 10 seconds for stopping the etch and removal of material with the remaining time use for drying.

After 15 cycles, the plate had been etched to a depth of .010-inch and into the white pigmented layer so that orange lacquer showed through indicating the depth of the etch.

After a final drying, the plate was mounted on a proof press and copies were run which carried the complete image of the original.

*Example III*

An element of the type described in Example I was prepared except that titanium dioxide pigment was coated on top of the acetatebutyrate layer just under the subbing layer. The presence of the white layer just beneath the emulsion increased effective sensitivity so that the exposure was reduced to 15 seconds at 2 feet from a 100-watt lamp.

A similar element having titanium dioxide dispersed uniformly throughout the acetatebutyrate layer produced nearly the same results.

*Example IV*

An element having an emulsion of the type described in Example I on top of a gel nitrate sub having 2× thickness of the sub in Example I was prepared. It was exposed as in Example I to a negative having both broad line work and an area of 120-line screen detail. When the hand etching operation was carried out using 1 part of ethyl acetate and 3 parts of ethyl alcohol, there was insufficient attack through the subbing layer so that etching took place very irregularly and to an insufficient degree in the shadow detail. Attempts to increase the etching action by increased pressure, resulted in the removal of some of the fine dot detail in the highlight areas.

*Example V*

An element of the type described in Example I, but 30 inches x 30 inches in size, was exposed to an arc lamp at an intensity of 500 footcandles for 25 seconds and after processing and drying as in Example I, was etched as in the same manner as Example II. The solvent used consisted of:

| | Parts |
|---|---|
| Isopropyl acetate | 5 |
| Isopropyl alcohol | 3 |
| n-Butyl acetate | 3 |

The rotation of the cylinder to which the plate was attached was slowed down so that about 1½ minutes were required for each revolution. The solvent scrubbing action took place for 20 seconds, the squeegeeing action over an additional 5 seconds, and the remaining time was used for drying the plate by means of about 4 infrared tubular lamps. After 23 minutes, 15 separate cycles had been completed and the plate was etched through the 0.010-inch support to the orange lacquer of the supporting metal in the broad areas which were free of fine detail. In the areas of screen line detail, the depth of the etch was much less but ideal for printing. Examination of the dot and line structure under a 30× steromicroscope showed a conical dot structure with no undercutting. Both fine line work and the fine dot detail were excellently preserved. The etched plate was used to prepare over 50,000 prints on a printing press.

*Example VI*

The element and the process of our invention has also been used to prepare plates for gravure printing. The light-sensitive emulsion used was the incorporated-developer type described in Example I. The subbing between a 0.005-inch clear acetatebutyrate sheet and the emulsion was composed of 65 percent gel and 35 percent cellulose nitrate at a coverage of 0.010 gram per square foot. An aluminum plate 0.03-inch was laminated to the photosensitive element as in Example I.

The plate was exposed to a variable-area screen positive which was made via a commercial Kodak gravure screen. The development and wash-off were carried out as in Example I. The dried down gel resist layer was about 0.0001-inch thick.

Shallow etching required for gravure printing was carried out by the process described in Example II using butyl acetate. After the first cycle the maximum depth of the etch in the largest cell was about 0.0008-inch. After the second cycle, the largest cells were etched to about 0.0015-inch while the smallest cells were etched about 0.00015-inch. After just two etch cycles the plate was removed and printed on a gravure proofing press. A steel doctor blade was used with conventional inks to demonstrate that particularly good quality reproductions were made. The combined control of the cell area and depth offered by this procedure produces prints with enhanced tone reproductions.

*Example VII*

An element of the type described in Example III was prepared wherein the thickness of the pigmented layer of acetatebutyrate was increased to 0.015-inch and the steel backing and vinyl bonding composition were omitted. After exposure to a line image covering a 3-inch x 5-inch area, the plate was processed as in Example II and hand etched as in Example I to a depth of 0.005-inch. The resulting card with a minimum thickness of 0.005-inch was rigid enough to be useful as an identification card. It contained a raised pattern useful in credit card applications whereby printed copies could be made by pressing a sheet into contact with the image using carbon paper, or the like. The quality of the printing surface was adequate to resolve very fine detail.

*Example VIII*

An original subject having both fine and broad line detail was copied with a process camera, onto an 8-inch x 10-inch sheet of relief printing plate material consisting of a 0.010-inch lacquered steel plate having laminated thereto a 0.012-inch cellulose acetatebutyrate layer, bearing a high contrast graphic arts film (Kodalith) emulsion over a subbing layer comprising 0.015 gram per square foot of 60 percent gelatin, 40 percent cellulose nitrate composition applied from an acetone methanol water solution. The latent image was developed to a direct positive relief by using the peroxide etch reversal process described in "Kodak Formulas for the Graphic Arts" (Kodak Pamphlet No. Q–11), which employs Kodak Etch Bath EB–2.

The resist image formed by the above procedure was etched as described in Example V, except 20 separate cycles were carried out to etch completely through the cellulose acetatebutyrate layer in the nonimage areas.

The invention has been described in detail with particular reference to preferred embodiments thereof, but it will be understood that variations and modifications can be effected within the spirit and scope of the invention as described hereinabove and as defined in the appended claims.

We claim:

1. A photosensitive material for preparing relief printing plates comprising a cellulose ester support having a thickness of 0.010 to 0.020-inch, having thereon a gelatino-silver halide, light-sensitive emulsion strongly adhered to the support by means of a thin subbing layer no thicker than that having a coverage of about 0.012 g./sq. ft. and capable of being etched imagewise by a semisolvent for the cellulose ester.

2. A photographic printing plate comprising a cellulose acetatebutyrate support having a thickness of 0.010 to 0.020-inch, having thereon a gelatino-silver halide, light-sensitive emulsion adhered to the support by means of a thin subbing layer no thicker than that having a coverage of about 0.012 g./sq. ft. and capable of being readily etched imagewise by a semisolvent for the cellulose acetatebutyrate.

3. A photographic printing plate comprising a cellulose ester support laminated to a base and having a substantially unhardened gelatino-silver halide, light-sensitive emulsion adhered to the support by means of a thin subbing layer no thicker than that having a coverage of about 0.012 g./sq. ft. and capable of being readily etched imagewise by a semisolvent for the cellulose ester.

4. A photographic printing plate comprising a cellulose ester support having a thickness of 0.010 to 0.020-inch laminated to a base and having a substantially unhardened gelatino-silver halide, light-sensitive emulsion adhered to the support by means of a thin subbing layer no thicker than that having a coverage of about 0.012 g./sq. ft. and capable of being readily etched imagewise by a semisolvent for the cellulose ester.

5. A photographic printing plate comprising a cellulose acetatebutyrate support laminated to a base and having a substantially unhardened gelatino-silver halide, light-sensitive emulsion adhered to the support by means of a thin subbing layer no thicker than that having a coverage of about 0.012 g./sq. ft. and capable of being readily etched imagewise by a semisolvent for the cellulose acetatebutyrate.

6. A photographic printing plate comprising a cellulose acetatebutyrate support having a thickness of 0.010 to 0.020-inch laminated to a base and having a substantially unhardened gelatino-silver halide, light-sensitive emulsion adhered to the support by means of a thin subbing layer no thicker than that having a coverage of about 0.012 g./sq. ft. and capable of being readily etched imagewise by a semisolvent for the cellulose acetatebutyrate.

7. A photographic printing plate of claim 3 wherein the base is selected from the class consisting of rigid and semirigid bases.

8. A photographic printing plate of claim 3 wherein the base is a metallic sheet.

9. A photographic printing plate of claim 4 wherein the base is a metallic sheet.

10. A photographic printing plate of claim 5 wherein the base is a metallic sheet.

11. A photographic printing plate of claim 6 wherein the base is a metallic sheet.

12. A photographic printing plate comprising a cellulose acetatebutyrate support having a thickness of 0.010 to 0.020-inch laminated to a base and having a substantially unhardened gelatino-silver halide, light-sensitive emulsion adhered to the support by means of a thin gelatin-cellulose nitrate subbing layer no thicker than that having a coverage of about 0.012 g./sq. ft. and capable of being etched imagewise readily by a semisolvent for the cellulose acetatebutyrate.

13. A photographic printing plate comprising a cellulose acetatebutyrate support having a thickness of 0.010 to 0.020-inch laminated to a metallic sheet and having a substantially unhardened gelatino-silver halide emulsion adhered to the support by means of a thin gelatin-cellulose nitrate subbing layer no thicker than that having a coverage of about 0.012 g./sq. ft. and capable of being etched imagewise readily by a semisolvent for the cellulose acetatebutyrate.

14. A photographic printing plate of claim 13 wherein the metallic sheet is steel.

15. A process for preparing printing plates having raised printing surfaces free of undercutting in the support portions thereof which comprises developing with a silver halide tanning developer an exposed, substantially unhardened silver halide emulsion attached to a cellulose ester support by a thin subbing layer no thicker than that having a coverage of about 0.012 g./sq. ft. and capable of being etched imagewise by a semisolvent for the cellulose ester, removing the unexposed portions of the emulsion to form a resist image in hardened gelatin, etching the exposed areas of the cellulose ester support by repeated cycles of (1) etching with a semisolvent for the ester, (2) removing the semisolvent and (3) drying.

16. A process for preparing printing plates having raised printing surfaces free of undercutting in the support portions thereof which comprises developing with a silver halide tanning developer an exposed substantially unhardened silver halide emulsion attached to a cellulose acetatebutyrate support having a thickness of 0.010 to 0.020-inch by a thin subbing layer no thicker than that having a coverage of about 0.012 g./sq. ft. and capable of being readily etched imagewise by a semisolvent for the cellulose acetatebutyrate, removing the unexposed portions of the emulsion to form a resist image in hardened gelatin, etching the exposed areas of the cellulose acetatebutyrate support by repeated cycles of (1) etching with semisolvent, (2) removing the semisolvent and (3) drying.

17. A process for preparing printing plates having raised printing surfaces free of undercutting in the support portions thereof which comprises developing with a silver halide tanning developer an exposed substantially unhardened silver halide emulsion attached to a cellulose ester support having a thickness of 0.010 to 0.020-inch by a thin subbing layer no thicker than that having a coverage of about 0.012 g./sq. ft. and capable of being readily etched imagewise by a semisolvent for the cellulose ester, said support laminated to a base, removing the unexposed portions of the emulsion to form a resist image in hardened gelatin, etching the exposed areas of the cellulose ester support by repeated cycles of (1) etching with semisolvent, (2) removing the semisolvent and (3) drying.

18. A relief printing plate having an image thereon comprising a cellulose ester support laminated to a base and having a gelatino-silver image layer adhered to the image areas of the support by means of a thin subbing layer no thicker than that having a coverage of about 0.012 g./ft.$^2$ and capable of being readily etched imagewise by a semisolvent for the cellulose ester, said plate having the cellulose ester etched to a depth of at least 0.005 inch in the deepest of the non-image areas of the cellulose ester support by repeated cycles of etching with a semisolvent for the ester, removing the semisolvent and drying to form a relief image with line or dot areas substantially free from undercutting.

19. A relief printing plate having an image thereon comprising a cellulose ester support having a thickness of 0.010 to 0.020-inch in the image areas laminated to a base and having a gelatino-silver image layer adhered to the image areas of the support by means of a thin subbing layer no thicker than that having a covering of about 0.012 g./ft.$^2$ and capable of being readily etched imagewise by a semisolvent for the cellulose ester, said plate having the cellulose ester etched to a depth of at least 0.005 inch in the deepest of the non-image areas of the cellulose ester support by repeated cycles of etching with a semisolvent for the ester, removing the semisolvent and drying to form a relief image with line or dot areas substantially free from undercutting.

20. A relief printing plate having an image thereon comprising a cellulose acetate butyrate support having a thickness of 0.010 to 0.020-inch in the image areas laminated to a base and having a gelatino-silver image layer adhered to the image areas of the support by means of a thin subbing layer no thicker than that having a coverage of about 0.12 g./ft.$^2$ and capable of being readily etched imagewise by a semisolvent for the cellulose acetate butyrate, said plate having the cellulose acetate butyrate etched to a depth of at least 0.005 inch in the deepest of the non-image areas of the cellulose acetate butyrate support by repeated cycles of etching with a semisolvent for the cellulose acetate butyrate, removing the semisolvent and drying to form a relief image with line or dot areas substantially free from undercutting.

References Cited by the Examiner

UNITED STATES PATENTS

| | | | |
|---|---|---|---|
| 2,257,143 | 9/1941 | Wood | 96—36 X |
| 2,398,056 | 4/1946 | Staud | 96—83 |
| 2,494,053 | 1/1950 | Mitson | 96—35 X |
| 2,614,932 | 10/1952 | Nadeau et al. | 96—83 |
| 2,923,673 | 2/1960 | Munger | 96—35 X |
| 3,036,916 | 5/1962 | Notley | 96—35 X |
| 3,043,695 | 7/1962 | Alles | 96—83 |
| 3,060,027 | 10/1962 | Freundorfer et al. | 96—35 |
| 3,127,301 | 3/1964 | Sigler | 96—35 |

NORMAN G. TORCHIN, *Primary Examiner.*

ALEXANDER D. RICCI, *Examiner.*

C. BOWERS, *Assistant Examiner.*